United States Patent
Dudas et al.

(10) Patent No.: US 10,853,709 B1
(45) Date of Patent: Dec. 1, 2020

(54) IMAGE FILTERING FOR IMPROVED LOSSLESS COMPRESSION

(71) Applicants: Dan Dudas, Timisoara (RO); Walter F. Kailey, Frederick, CO (US)

(72) Inventors: Dan Dudas, Timisoara (RO); Walter F. Kailey, Frederick, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/719,370

(22) Filed: Dec. 18, 2019

(51) Int. Cl.
| | |
|---|---|
| G06K 15/02 | (2006.01) |
| H04N 1/40 | (2006.01) |
| H04N 1/41 | (2006.01) |
| G06F 3/12 | (2006.01) |
| H04N 1/62 | (2006.01) |
| H04N 1/64 | (2006.01) |

(52) U.S. Cl.
CPC ......... *G06K 15/1846* (2013.01); *G06F 3/122* (2013.01); *G06F 3/1215* (2013.01); *G06F 3/1229* (2013.01); *G06F 3/1282* (2013.01); *G06F 3/1297* (2013.01); *G06K 15/1869* (2013.01); *H04N 1/40093* (2013.01); *H04N 1/41* (2013.01); *H04N 1/62* (2013.01); *H04N 1/64* (2013.01)

(58) Field of Classification Search
None
See application file for complete search history.

(56) References Cited

U.S. PATENT DOCUMENTS

| | | | |
|---|---|---|---|
| 5,907,665 A | 5/1999 | Sobol et al. | |
| 8,326,067 B2 | 12/2012 | Furbeck | |
| 8,983,185 B2 | 3/2015 | Deng et al. | |
| 9,020,287 B2 | 4/2015 | Xu et al. | |
| 9,245,214 B2 | 1/2016 | Varga et al. | |
| 10,140,728 B1 * | 11/2018 | Dawood | G06T 9/00 |

(Continued)

FOREIGN PATENT DOCUMENTS

CN 101032081 B 5/2010

OTHER PUBLICATIONS

Sukant Vats et al; An Image-Compression Decomposition Analysis of sub-Bands using Threshold Implementation; Dept of Electronics and Communication Engineering; Ludhiana, India; IEEE 2015.

(Continued)

*Primary Examiner* — Scott A Rogers
(74) *Attorney, Agent, or Firm* — Duft & Bornsen, PC

(57) ABSTRACT

Systems, methods, software for image filtering. In one embodiment, a system receives a raster image comprising an array of pixels, divides the raster image into regions of pixels, and identifies a region size limit for the regions. The system performs image filtering on each region with an image filter that operates based on a filter parameter that is adjustable between a first value where minimal filtering is performed and a second value where maximum filtering is performed. For the image filtering, the system measures a compressed region size of the region when compressed with a run-length encoding scheme, computes the filter parameter for the region based on the compressed region size and the region size limit, and applies the image filter on the region based on the filter parameter computed for the region to generate a filtered region having increased redundant patterns of pixel values.

20 Claims, 7 Drawing Sheets

(56) References Cited

U.S. PATENT DOCUMENTS

| | | | | |
|---|---|---|---|---|
| 2002/0118748 A1* | 8/2002 | Inomata | ............... | H04N 19/124 |
| | | | | 375/240.04 |
| 2004/0013310 A1* | 1/2004 | Suino | ................... | H04N 19/152 |
| | | | | 382/240 |
| 2012/0321206 A1* | 12/2012 | Sato | ....................... | H04N 19/86 |
| | | | | 382/233 |
| 2014/0092998 A1* | 4/2014 | Zhu | ..................... | H04N 19/186 |
| | | | | 375/240.29 |

OTHER PUBLICATIONS

Ahia Brahimi et al; A Lossless Image compression Algorithm Using Variable Block Size Segmentation; IEEE 1998.

* cited by examiner

US 10,853,709 B1

IMAGE FILTERING FOR IMPROVED LOSSLESS COMPRESSION

TECHNICAL FIELD

This disclosure relates to the field of image formation, and more particularly, to an image filtering technique for digital images.

BACKGROUND

Entities with substantial printing demands often use a production printer that prints on a web of print media at high-speed (e.g., one hundred pages per minute or more). A production printer typically includes a print controller that controls the overall operation of the printing system, and a print engine that physically marks the web. Printers are continuously being designed to improve their performance in many respects. Generally, desirable printer features include the ability to print high-quality images at high speed. Printing high-quality images generally entails processing high pixel density images. Printing such images at high speed additionally requires processing the high pixel density images at high speed. Processing large amounts of information in short periods of time impose high performance data computation and/or data transportation challenges within a printer that is a challenge for printer designers to suitably address.

SUMMARY

Provided herein is an image filtering technique in an image forming apparatus that improves compression of a raster image. As an overview, a system as described herein performs a type of lossy filtering that operates based on an adjustable filter parameter. The filter parameter is adjustable between a first value where no or minimal filtering is performed, and a second value where maximum filtering is performed. A raster image is segmented into regions, and image filtering is iteratively performed on the regions. For each region, the filter parameter is selected. The size (e.g., in bytes) of the region when compressed is compared to a size limit (e.g., in bytes) for the regions to select the filter parameter. The size limit may be computed based on internal bandwidth limitations within the image forming apparatus. Thus, the amount of filtering performed on each of the regions is adjustable based on the estimated size of the regions when compressed. One technical benefit is that the image filtering produces less distortion on smaller-sized regions where less compression is needed, and higher compression gain on larger-sized regions where more compression is needed.

One embodiment comprises an image compression system that includes at least one processor, and a memory including computer program code executable by the processor. The processor causes the image compression system to receive a raster image comprising an array of pixels, divide the raster image into regions of the pixels, and identify a region size limit for the regions. For each region of the regions, the processor further causes the image compression system to perform image filtering on the region with an image filter that operates based on a filter parameter, where the filter parameter is adjustable between a first value where minimal filtering is performed and a second value where maximum filtering is performed. For the image filtering, the processor further causes the image compression system to measure a compressed region size of the region when compressed with a run-length encoding scheme, compute the filter parameter for the region based on the compressed region size and the region size limit, and apply the image filter on the region based on the filter parameter computed for the region to generate a filtered region having increased redundant patterns of pixel values.

Another embodiment comprises a method of image compression. The method includes receiving a raster image comprising an array of pixels, dividing the raster image into regions of the pixels, and identifying a region size limit for the regions. For each region of the regions, the method further includes performing image filtering on the region with an image filter that operates based on a filter parameter, where the filter parameter is adjustable between a first value where minimal filtering is performed and a second value where maximum filtering is performed. The image filtering for each region comprises measuring a compressed region size of the region when compressed with a run-length encoding scheme, computing the filter parameter for the region based on the compressed region size and the region size limit, and applying the image filter on the region based on the filter parameter computed for the region to generate a filtered region having increased redundant patterns of pixel values.

Another embodiment comprises a non-transitory computer readable medium embodying programmed instructions which, when executed by a processor, are operable for performing a method of image compression. The method includes receiving a raster image comprising an array of pixels, dividing the raster image into regions of the pixels, and identifying a region size limit for the regions. For each region of the regions, the method further includes performing image filtering on the region with an image filter that operates based on a filter parameter, where the filter parameter is adjustable between a first value where minimal filtering is performed and a second value where maximum filtering is performed. The image filtering for each region comprises measuring a compressed region size of the region when compressed with a run-length encoding scheme, computing the filter parameter for the region based on the compressed region size and the region size limit, and applying the image filter on the region based on the filter parameter computed for the region to generate a filtered region having increased redundant patterns of pixel values.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
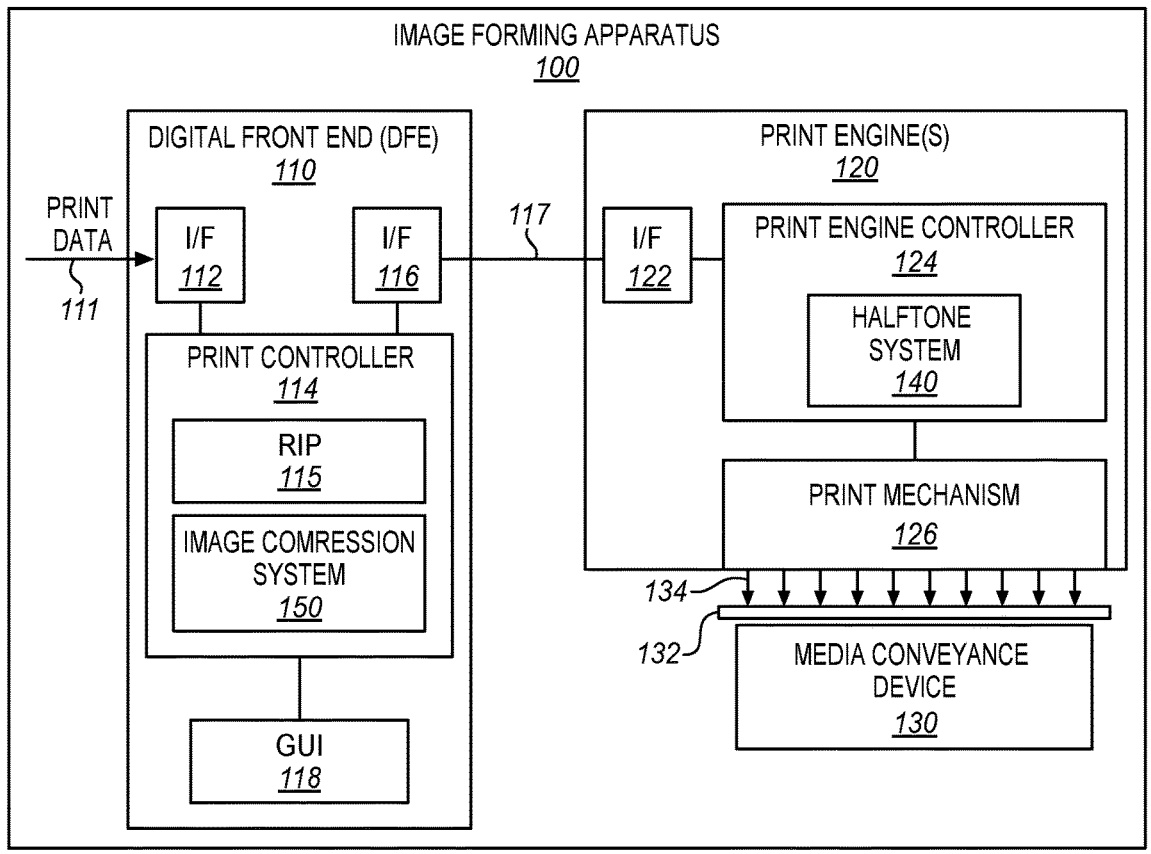
FIG. 1 is a schematic diagram of an image forming apparatus in an illustrative embodiment.

FIG. 1 is a schematic diagram of an image forming apparatus 100 in an illustrative embodiment. Image forming apparatus 100 is a type of device that executes an image forming process (e.g., printing) on a recording medium 132. Image forming apparatus 100 may comprise a continuous-form printer that prints on a web of continuous-form media, such as paper. Although a continuous-form printer is discussed, concepts described herein may also apply to alternative print systems, such as cut-sheet printers, wide format printers, 3D printers, etc.

In this embodiment, image forming apparatus 100 includes a Digital Front End (DFE) 110, one or more print engines 120, and a media conveyance device 130. DFE 110 comprises a device, circuitry, and/or system configured to accept print data 111, and convert the print data 111 into a suitable format for print engine 120. DFE 110 includes an Input/Output (I/O) interface 112, a print controller 114, a print engine interface 116, and a Graphical User Interface (GUI) 118. I/O interface 112 comprises a device, circuitry, and/or other component configured to receive print data 111 from a source. For example, I/O interface 112 may receive the print data 111 from a host system (not shown), such as a personal computer, a server, etc., over a network connection, may receive print data 111 from an external memory, etc. Thus, I/O interface 112 may be considered a network interface in some embodiments. The print data 111 comprises a file, document, print job, etc., that is formatted with a Page Description Language (PDL), such as PostScript, Printer Command Language (PCL), Intelligent Printer Data Stream (IPDS), etc. Print controller 114 comprises a device, circuitry, and/or other component configured to transform the print data 111 into one or more digital images that may be used by print engine 120 to mark a recording medium 132 with ink, toner, or another recording material. Thus, print controller 114 includes a Raster Image Processor (RIP) 115 that rasterizes the print data 111 to generate digital images. A digital image comprises a two-dimensional array of pixels. Whereas the print data 111 in PDL format is a high-level description of the content (e.g., text, graphics, pictures, etc.), a digital image defines a pixel value or color value for each pixel in a display space. Print engine interface 116 comprises a device, circuitry, and/or other component configured to communicate with print engine 120, such as to transmit digital images to print engine 120. Print engine interface 116 is communicatively coupled to print engine 120 via a communication link 117 (e.g., a fiber link, a bus, etc.), and is configured to use a data transfer protocol to transfer the digital images to print engine 120. GUI 118 is a hardware component configured to interact with a human operator. GUI 118 may include a display, screen, touch screen, or the like (e.g., a Liquid Crystal Display (LCD), a Light Emitting Diode (LED) display, etc.). GUI 118 may include a keyboard or keypad, a tracking device (e.g., a trackball or trackpad), a speaker, a microphone, etc. A human operator may access GUI 118 to view status indicators, view or manipulate settings, schedule print jobs, etc.

Print engine 120 includes a DFE interface 122, a print engine controller 124, and a print mechanism 126. DFE interface 122 comprises a device, circuitry, and/or other component configured to interact with DFE 110, such as to receive digital images from DFE 110. Print engine controller 124 comprises a device, circuitry, and/or other component configured to process (e.g., decompression) the digital images received from DFE 110, and provide control signals to print mechanism 126. Print mechanism 126 is a device or devices that mark the recording medium 132 with a recording material 134, such as ink, toner, etc. Print mechanism 126 may be configured for variable droplet or dot size to reproduce multiple intensity levels or bi-level intensities where a pixel is either "on" or "off". For example, if print mechanism 126 is an ink-jet device, then multiple intensity levels per pixel may be achieved by printing one, two, or several droplets at the same position, or varying the size of a droplet. Recording medium 132 comprises any type of material suitable for printing upon which recording material 134 is applied, such as paper (web or cut-sheet), plastic, card stock, transparent sheets, a substrate for 3D printing, cloth, etc. In one embodiment, print mechanism 126 may include one or more printheads that are configured to jet or eject droplets of a print fluid, such as ink (e.g., water, solvent, oil, or UV-curable), through a plurality of orifices or nozzles. The orifices or nozzles may be grouped according to ink types (e.g., colors such as Cyan (C), Magenta (M), Yellow (Y), Key black (K) or formulas such as for pre-coat, image and protector coat), which may be referred to as color planes. In another embodiment, print mechanism 126 may include a drum that selectively collects electrically-charged powdered ink (toner), and transfers the toner to recording medium 132. Media conveyance device 130 is configured to move recording medium 132 relative to print mechanism 126. In other embodiments, portions of print mechanism 126 may be configured to move relative to recording medium 132.

Image forming apparatus 100 may include various other components not specifically illustrated in FIG. 1.

When RIP 115 rasterizes the print data 111, the output is a digital continuous tone image where individual pixels are defined with pixel values that are relatively large. For example, the digital continuous tone image may have 8-bit pixel values or larger. A digital continuous tone image generated by RIP 115 is referred to herein as a "raster image". DFE 110 is configured to transmit the raster image to print engine 120 over communication link 117 using print engine interface 116. DFE 110 may alternatively transmit other types of raster images to print engine 120 over communication link 117 that are not specifically rasterized by RIP 115.

An 8-bit pixel value in a raster image may represent 256 different intensities of a color (e.g., grayscale). However, a typical print mechanism (e.g., print mechanism 126) may not be capable of reproduction at 256 different levels. Thus, a halftoning process may be performed to define the individual pixels with lower multi-bit values, such as two-bits, three-bits, etc. FIG. 1 also illustrates a halftone system 140 implemented in print engine controller 124. Halftone system 140 comprises circuitry, logic, hardware, and/or other components configured to perform a halftoning process (e.g., multi-level halftoning or bi-level halftoning) on one or more raster images.

The bandwidth of communication paths (e.g., communication link 117) within image forming apparatus 100 can create a bottleneck when transmitting large raster images, such as between DFE 110 and print engine 120. To address these and other issues, an image compression system 150 is implemented in image forming apparatus 100. Image compression system 150 is configured to use an image filtering technique on an uncompressed raster image to form a filtered image. Image compression system 150 may be further configured to use a compression technique on the filtered image to form a compressed image having a smaller footprint than the uncompressed raster image. Although image compression system 150 is shown as being implemented in print controller 114 of DFE 110, image compression system 150 may be implemented in another portion of image forming apparatus 100, in a host system or another system coupled to image forming apparatus 100, etc.

Figure 2:
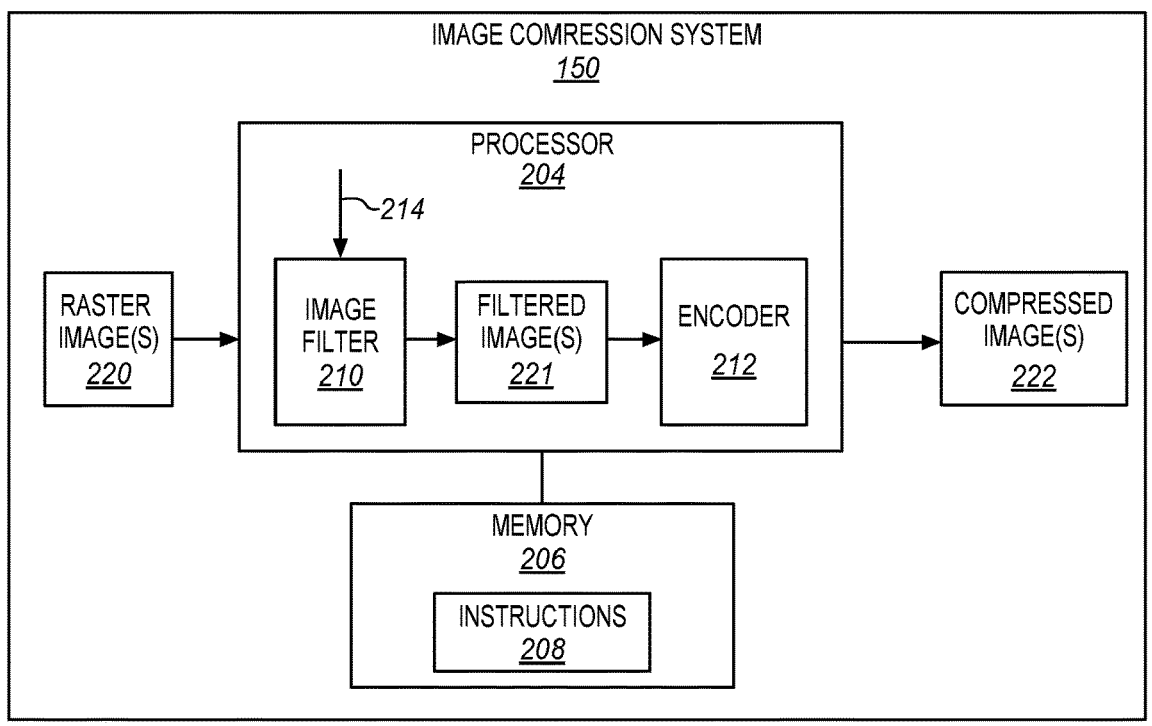
FIG. 2 is a schematic diagram of an image compression system in an illustrative embodiment.

FIG. 2 is a schematic diagram of image compression system 150 in an illustrative embodiment. Image compression system 150 includes one or more processors 204 and a memory 206. Processor 204 represents the internal circuitry, logic, hardware, etc., that provides the functions of image compression system 150. Processor 204 may be configured to execute instructions 208 (i.e., computer program code) for software that are loaded into memory 206. Processor 204 may comprise a set of one or more processors or may comprise a multi-processor core, depending on the particular implementation. Memory 206 is a computer readable storage medium for data, instructions 208, applications, etc., and is accessible by processor 204. Memory 206 is a hardware storage device capable of storing information on a temporary basis and/or a permanent basis. Memory 206 may comprise volatile or non-volatile Random-Access Memory (RAM), Read-Only Memory (ROM), FLASH devices, volatile or non-volatile Static RAM (SRAM) devices, magnetic disk drives, Solid State Disks (SSDs), or any other volatile or non-volatile storage device.

Processor 204 is configured to implement an image filter 210 that performs a lossy image filtering technique on a raster image 220 to form a filtered image 221. Image filtering makes an approximation of a pixel value for a run length of neighboring pixels in a raster image, and assigns the same pixel value to the pixels in the run length to increase redundant patterns of pixel values, such as along scan lines. Although some fine detail is lost because neighboring pixels in a run length are assigned the same pixel value, the overall possible dynamic range of colors within the raster image 220 is not lost because the "same" pixel value assigned to multiple neighboring pixels can theoretically be any one of the 256 possible pixel values (in the case of 8-bit pixels). The lossy image filtering technique alters the raster image 220 so that the filtered image 221 is more suitable for run-length encoding (i.e., increases compressibility). Processor 204 is further configured to implement an encoder 212 that performs a run-length encoding scheme (e.g., PackBits) on a filtered image 221 to form a compressed image 222. Run-length encoding is a form of lossless compression in which runs of pixels having the same pixel value are stored as a single data value and count, rather than as the original run of pixels. Whereas the raster image 220 or filtered image 221 include one pixel value per pixel, the compressed image 222 represents a run-length of pixels with two values: one indicating a number of pixels in the run length, and another indicating the pixel value assigned to each of the pixels.

Image filter 210 is considered "adjustable" in this embodiment in that the amount of filtering is adjustable between no (or minimal) filtering and maximum filtering. Adjustability of image filter 210 is provided by a filter parameter 214 that is input to image filter 210. Filter parameter 214 is adjustable between a first value where no (or minimal amount of) filtering is performed, and a second value where maximum filtering is performed. When filter parameter 214 is set to the first value (e.g., a value of "0"), image filter 210 may not perform filtering, so little or no distortion is added to the original raster image 220. When filter parameter 214 is set to the second value (e.g., a maximum value larger than "0"), image filter 210 performs maximum filtering, which adds an acceptable amount of distortion to the original raster image 220. As will be described in more detail below, filter parameter 214 may be set between the first value and the second value to balance amounts of distortion versus amounts of compressibility. For instance, filter parameter 214 may be adjusted to throttle the amount of filtering in order to minimize distortion while staying within the internal bandwidth limit for communication links (e.g., communication link 117) of image forming apparatus 100.

Figure 3:
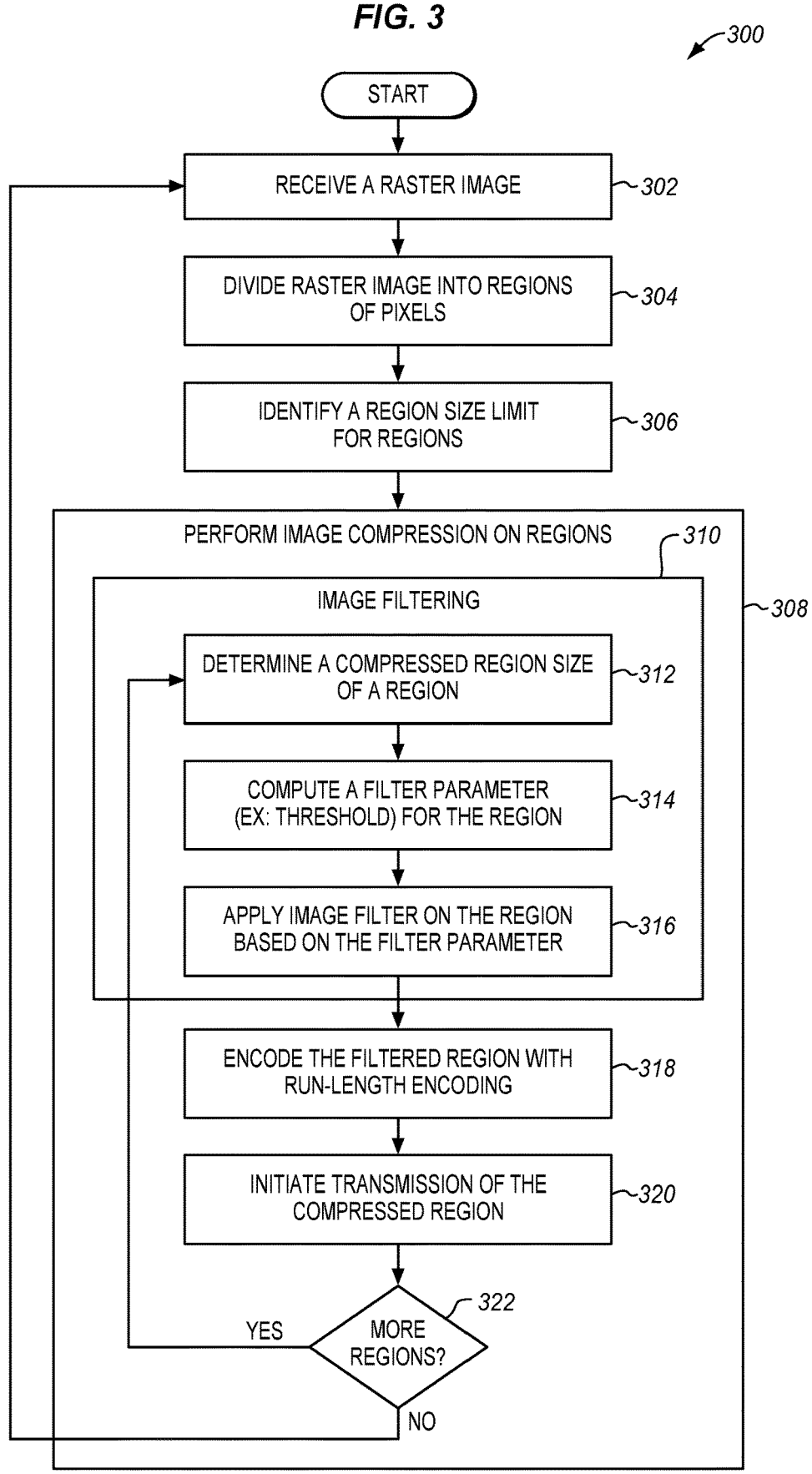
FIG. 3 is a flowchart illustrating a method of image compression in an illustrative embodiment.

FIG. 3 is a flowchart illustrating a method 300 of image compression in an illustrative embodiment. The steps of method 300 are described with reference to image compression system 150 in FIG. 2, but those skilled in the art will appreciate that method 300 may be performed with other systems. The steps of the flowcharts described herein are not all inclusive and may include other steps not shown. The steps described herein may also be performed in an alternative order.

Figure 4:
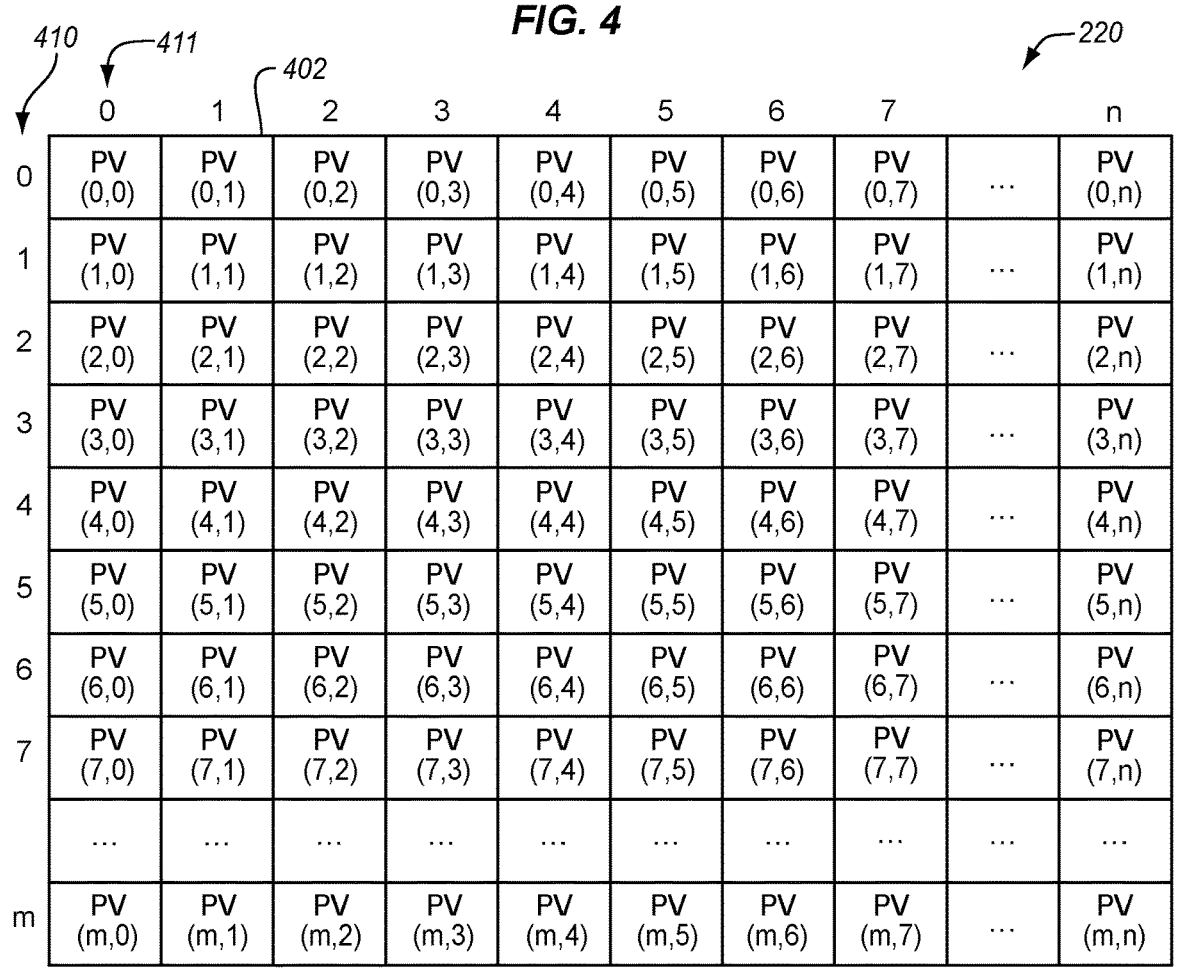
FIG. 4 illustrates a raster image.

In FIG. 3, processor 204 receives a raster image 220 (step 302) for a color plane, such as generated by RIP 115. Alternatively, raster image 220 may be retrieved from memory 206. FIG. 4 illustrates a raster image 220. Raster image 220 is a data structure that represents an array of pixels 402 with multi-bit pixel values (PV) that correspond to intensity levels. The pixels are arranged in rows 410 and columns 411. There are "m+1" number of rows 410, and "n+1" number of columns 411. For illustrative purposes, each pixel 402 is noted with a (row,column) identifier (e.g., "(0,0)"). Each pixel 402 has an associated pixel value PV that is defined by x-bits, such as 8-bits, 16-bits, etc. For example, if the pixel values are 8-bit, then each pixel 402 may have any value between 0-255 (decimal). Raster image 220 is for a single color plane, such as Cyan (C), Magenta (M), Yellow (Y), or Key black (K). Raster image 220 may represent a full sheetside of a print job, a portion of a sheetside, etc.

Figure 5:
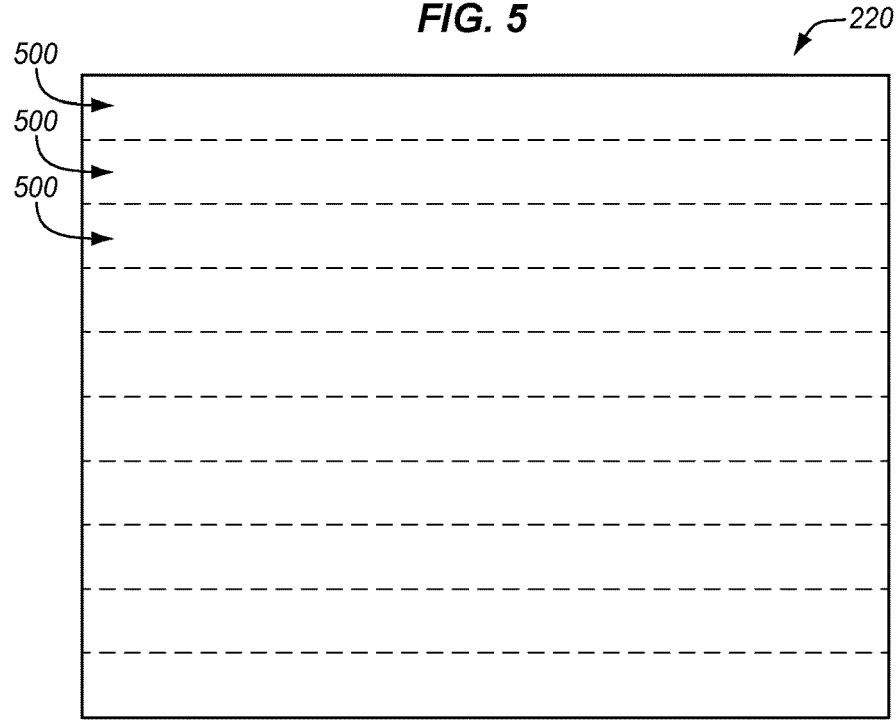
FIG. 5 illustrates a raster image divided into regions in an illustrative embodiment.

In FIG. 3, processor 204 divides the raster image 220 into regions of pixels 402 (step 304). FIG. 5 illustrates raster image 220 divided into regions 500 in an illustrative embodiment. In one embodiment, processor 204 may divide raster image 220 into regions 500 of substantially equal sized. Although regions 500 are illustrated as stripes traversing one or more rows of pixels, regions 500 may be defined as desired. In FIG. 3, processor 204 identifies a region size limit for the regions 500 (step 306). A region size limit refers to a maximum size of the data (e.g., in bytes) used to described a region 500 of pixels 402 when compressed with a run-length encoding scheme. The same region size limit may apply to each of the regions 500. In one embodiment, the region size limit may be restricted by a bandwidth limit of a communication link to ensure that the compressed size of a region does not exceed the bandwidth limit of the communication link. Thus, for step 306, processor 204 may compute the region size limit based on the bandwidth limit of a communication link (e.g., B in the following Equation 1 with example units of pixel values per second), such as communication link 117 between DFE 110 and print engine 120 (see FIG. 1). Alternatively, processor 204 may retrieve a region size limit from memory 206 that is predefined, receive a region size limit from an operator, etc.

Figure 6:
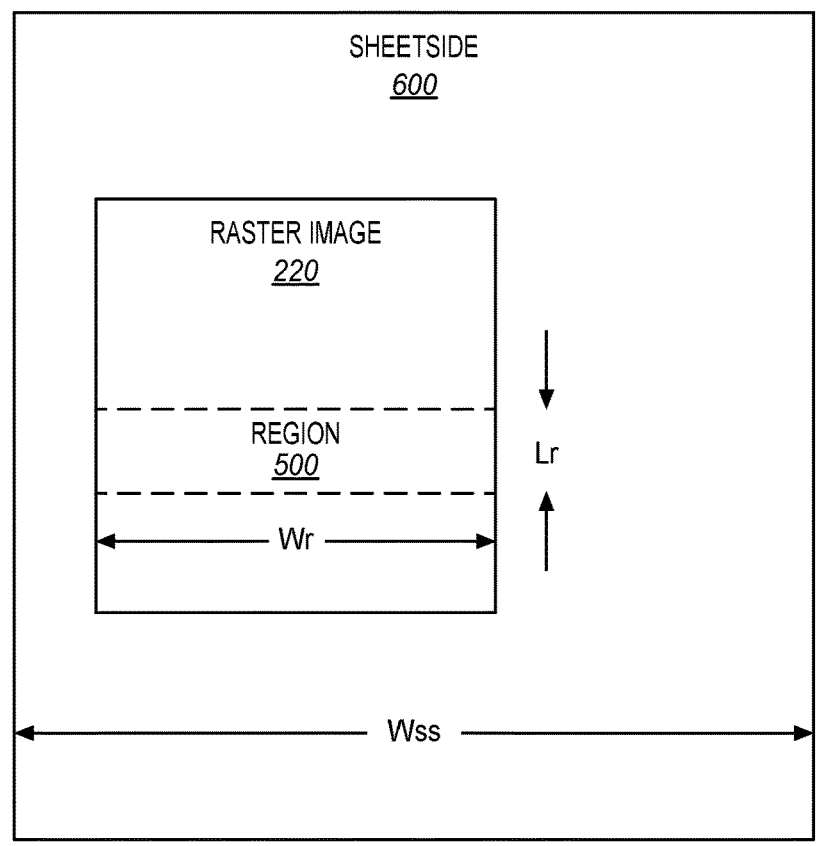
FIG. 6 illustrates a sheetside in an illustrative embodiment.

In other embodiments, the region size limit may be computed with additional information. FIG. 6 illustrates a sheetside 600 in an illustrative embodiment. Generally, a sheetside 600 includes one or more raster images 220 laid out for printing. Sheetside 600 has a width Wss (in pixels). One region 500 of raster image 220 is shown in FIG. 6, having a width Wr (in pixels) and a length Lr (in pixels). In addition to the bandwidth limit (B) of a communication link for step 306 of FIG. 3, processor 204 may further compute the region size limit based on the length Lr of a region 500, a width Wr of the region 500, a width Wss of the sheetside 600, a vertical resolution (Rv) in pixels per inch, a speed (Sp) of recording medium 132, and a number of color bands (C) in raster image 220. For example, the following Equation 1 may be used to compute the region size limit ($s_{limit}$) (e.g., total number of pixel values in the region) in one embodiment:

$$s_{limit} = \frac{L_r W_r / W_{ss}}{R_v S_p} B / C \qquad \text{Equation 1}$$

In FIG. 3, processor 204 performs image compression on one or more regions 500 of pixels 402 from raster image 220 (step 308), such as by iterating over the regions 500 of raster image 220. In this embodiment, image compression may be performed in two steps: image filtering (step 310) and encoding (step 318). To perform image filtering 310 on a region 500, processor 204 determines a compressed region size of the region 500 (step 312). The compressed region size is an estimate or computation of the size (e.g., in bytes) of a region 500 as unfiltered if/when compressed with a lossless run-length encoding scheme. Processor 204 computes a filter parameter 214 for the region 500 based on the compressed region size and the region size limit (step 314). The filter parameter 214 is a function of the compressed region size and the region size limit. Generally, the function for the filter parameter 214 may be defined so that there is no (or minimal amount of) filtering when the compressed region size is less than the region size limit by a percentage (e.g., 75%). When the compressed region size is less than the region size limit by the percentage, a region 500 may be compressed with a run-length encoding scheme and transmitted over a communication link without exceeding the bandwidth of the communication link. This may be beneficial as no distortion will be added to this type of region, which may include text, bar codes, or other objects that may be more sensitive to distortion. The function for the filter parameter 214 may be further defined so that the amount of filtering is gradually increased as the compressed region size approaches and exceeds the region size limit. Thus, the compressibility of a region 500 is increased (i.e., with an acceptable amount of distortion) as the compressed region size approaches and exceeds the region size limit. The function for the filter parameter 214 may be further defined so that there is maximum filtering when the compressed region size exceeds the region size limit by a percentage (e.g., 125%). When the compressed region size is greater than the region size limit by the percentage, a maximum amount of the filtering is performed at the expense of greater distortion to ensure that transmission of a region 500, when compressed, does not exceed the bandwidth of the communication link.

Figure 7:
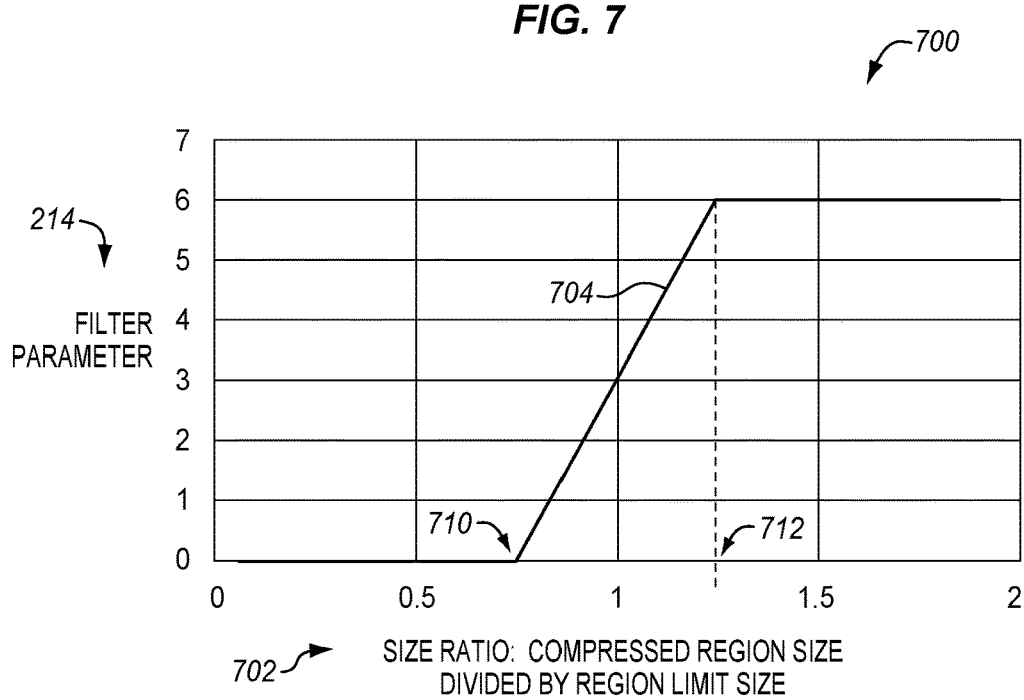
FIG. 7 is a graph of a function used to compute a filter parameter in an illustrative embodiment.

FIG. 7 is a graph 700 of a function used to compute the filter parameter 214 in an illustrative embodiment. According to graph 700, filter parameter 214 may be a function of a size ratio 702 for a region 500, where the size ratio 702 is a ratio of the compressed region size to the region size limit. The vertical axis of graph 700 represents the filter parameter 214, and the horizontal axis of graph 700 represents the size ratio 702. The function used to compute the filter parameter 214 is represented by line 704. Filter parameter 214 is mapped to the minimum value (e.g., "0") below a first ratio 710, where no filtering is performed at the minimum value. The first ratio 710 may be selected as desired so that filtering is turned off (or minimized) when the compressed region size is sufficiently smaller than the region size limit. For example, the first ratio 710 may be in the range of 70-80% (i.e., the compressed region size is in the range of 70-80% of the region size limit). Filter parameter 214 increases monotonically from the first value to a second value between the first ratio 710 and a second ratio 712. Thus, the amount of filtering increases as the compressed region size approaches and exceeds the region size limit. In this embodiment, filter parameter 214 increases linearly from the first value to a maximum value between the first ratio 710 and a second ratio 712. However, filter parameter 214 may increase in a non-linear manner (e.g., sigmoidal function, hyperbolic tangent, etc.) according to a monotonic function that saturates at the maximum value. Filter parameter 214 is mapped to the second value above the second ratio 712. The second ratio 712 may be selected as desired so that maximum filtering is applied when the compressed region size exceeds the region size limit by some amount. For example, the second ratio 712 may be in the range of 120-130% (i.e., the compressed region size is in the range of 120-130% of the region size limit). The computation of filter parameter 214 may be the same for each region 500 or may be different for different regions 500 (e.g., different values for first ratio 710, second ratio 712 and/or line 704 may be used for different regions 500 as desired).

Figure 8:
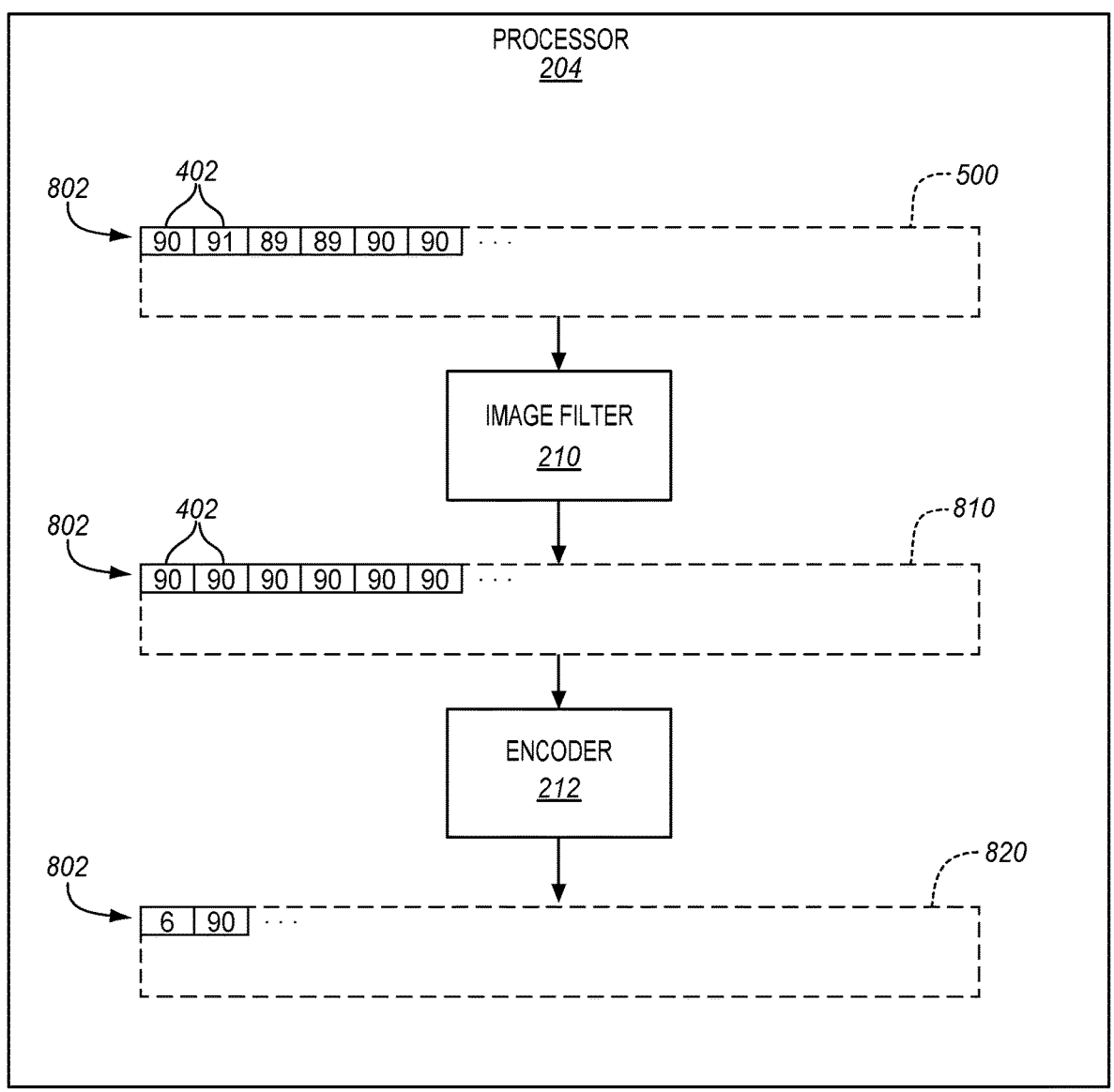
FIG. 8 is a schematic diagram of a processor in an illustrative embodiment.

In FIG. 3, processor 204 then applies image filter 210 on the region 500 based on the filter parameter 214 computed for the region 500 (step 316). In this step, image filter 210 is used to approximate of a pixel value for a run length of neighboring pixels in region 500, and assign the same pixel value to the pixels in the run length to increase redundant patterns of pixel values based on the filter parameter. Thus, the amount of filtering performed on this region 500 depends on the filter parameter 214 computed for this region 500. FIG. 8 is a schematic diagram of processor 204 performing image filtering in an illustrative embodiment. When input to image filter 210, region 500 is unfiltered and uncompressed.

Region 500 is shown with an illustrative run length 802 of pixels 402, having the values of "90", "91", "89", "89", "90", and "90". Image filter 210 performs image filtering on region 500 by approximating of a pixel value for the run length 802, and assigning the same pixel value to the pixels 402 in the run length. A similar process occurs for other run lengths in region 500 to generate a filtered region 810 having increased redundant patterns of pixel values as compared to unfiltered region 500. As shown in FIG. 8, each pixel value in the run length 802 has been assigned the same pixel value of "90". As stated above, the amount of filtering performed on a region 500 depends on the filter parameter 214 computed for that region 500. Thus, there may be cases where image filter 210 performs no filtering (no distortion), there may be cases where image filter 210 performs maximum filtering (maximum acceptable distortion), and there may be cases where image filter 210 performs an amount of filtering between no filtering and maximum filtering.

When image filter 210 does perform filtering on region 500, redundant patterns of pixel values are increased in filtered region 810 as compared to unfiltered region 500. Thus, filtered region 810 is more compressible than unfiltered region 500. After applying image filter 210 to region 500, processor 204 may encode on the filtered region 810 with a run-length encoding scheme to generate a compressed region (step 318 of FIG. 3). Run-length encoding is a form of lossless data compression. For example, encoder 212 may use PackBits or another type of lossless run-length encoding scheme to compress filtered region 810. FIG. 8 further illustrates encoding of filtered region 810. With run-length encoding, runs of pixels having the same pixel value are stored as a single data value and count. Thus, encoder 212 encodes run length 802 as a count value of "6" and a pixel value of "90" in a simple run length encoding example. It is noted that the count value of "6" is used to indicate a number of repeat runs of the pixel value, and the actual value may be a negative number (e.g., −5) for encoding schemes, such as PackBits, that use signed numbers between −128 and 127 to indicate repeat runs versus literal runs. A similar process occurs for other run lengths in filtered region 810 to generate a compressed region 820. It is noted that the encoding illustrated in FIG. 8 is just an example, as run-length encoding may use other formats, other header data, etc.

After compression, processor 204 may initiate transmission of the compressed region 820 to a destination (step 320). For example, processor 204 may initiate transmission of the compressed region 820 to print engine 120 over communication link 117 via print engine interface 116. Processor 204 may repeat the image compression 308 on other regions 500 of raster image 220 in a similar manner. For example, if there is a determination (step 322) that the image compression is performed on other regions 500, then method 300 returns to step 312 to determine the compressed size of the (next) region 500.

Method 300 illustrates a form of real-time image processing, where regions 500 of a raster image 220 are compressed and transmitted individually. However, variations of method 300 are considered herein. For example, processor 204 may store one or more compressed regions 820, and initiation transmission (step 320) of multiple compressed regions 820 at a later time. Also, processor 204 may iteratively perform image filtering on multiple regions 500 of raster image 220, and apply compression on multiple filtered regions 810 (step 316) at a later time. Thus, image filter 210 may be considered a "pre-filter" to encoder 212. Also, although image filtering 310 and encoding 318 are indicated as separate steps in FIG. 3, it is understood that image filter 210 may encode the data during image filtering (step 310).

Figure 9:
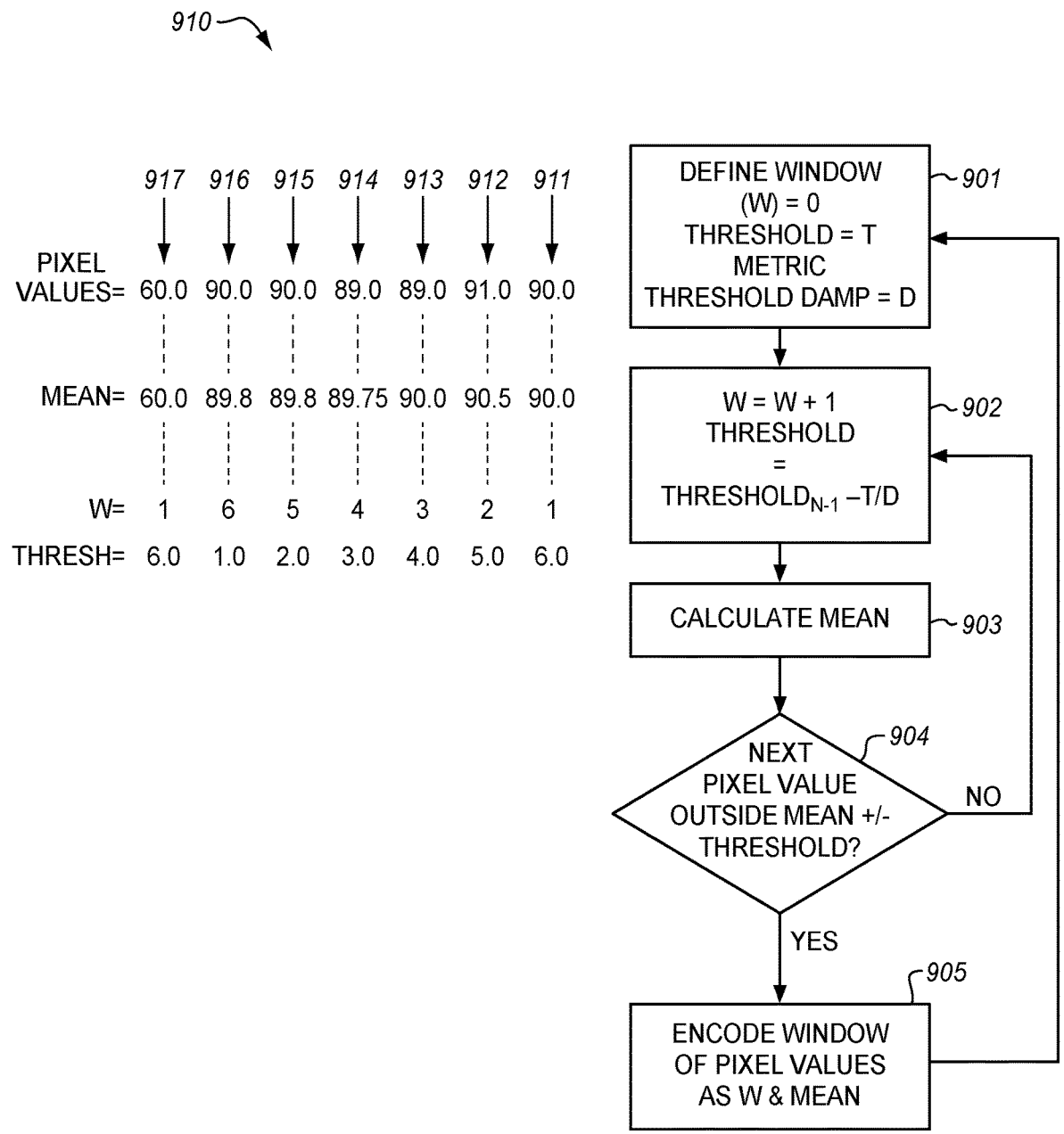
FIG. 9 illustrates an image compression technique.

One example of an image compression technique used in image compression system 150 was described in U.S. Pat. No. 9,245,214 (granted Jan. 26, 2016), which is incorporated by reference as fully included herein. FIG. 9 illustrates an image compression technique, as described in the '214 patent. Inset 910 of FIG. 9 shows a segment of a consecutive string of pixel values, such as from a region 500 as discussed above. The compression technique employs the concept of a window where pixels within the same window will be assigned the same pixel value.

In one embodiment, the beginning of the compression technique initially defines 901 a window size (W) of zero, a threshold metric (T) of some value, and a threshold dampening factor (D). The dampening factor D is the maximum value that the window size W can assume before the window is forced to close at W=D+1. Thus, D may be thought of as a maximum window width. The threshold metric (T) is one example of a filter parameter 214 as described above. Thus, the threshold metric may be selected for a region 500 of raster image 220, such as based on graph 700 in FIG. 7. For the purposes of this example, it may be assumed that the threshold metric (T) is determined to be 6.0. It may also be assumed that the threshold dampening factor D is 6.0.

With the setting of the initial window parameters (step 901), the compression technique starts with the first pixel 911 and defines the window metrics (step 902) for the present (first) iteration of the window. For the first pixel 911, the iterative adjustment of the window metrics specifies a window size of $W_1=1$ (there is presently only one pixel in the window) and a threshold value of $Threshold_1=6$ (the threshold=T for the first iteration). The compression technique then calculates the pixel value mean within the window (step 903), although median, average, etc., may be used in place of the mean. For the single, first pixel value 911, the calculated mean is simply the value of the first pixel itself ("90").

The next pixel 912 in the sequence is then obtained and compared against the calculated mean (step 904). If the next pixel is outside of the calculated mean by an amount that exceeds the threshold, then the window is closed (step 905) and a next window is started (step 901). If the next pixel is the same as or outside the calculated mean by an amount that is still within the threshold, then the window is extended for a next iteration (step 902). According to the example presently being discussed, the next pixel 912 in the sequence has a value of "91". With the threshold having a value of "6.0", the next pixel is within the threshold (i.e., the next pixel 912 is within a range of 90+/−6.0). As such, the window is extended (step 902) for a next iteration rather than being cut off.

The next iteration (step 902) may adjust the window size to $W_n=W_{n-1}+1=2$ (there are now two pixels in the window) and the threshold is reduced by an amount specified by the dampening factor. As such, for the second iteration (W=2), the threshold will be determined as $Threshold_1-(T/D)=6.0-(6.0/6.0)=6.0-1.0=5.0$. Thus, with each iteration, the threshold becomes smaller making it less likely the window will be extended on the next iteration but nevertheless permitting the window to be extended so long as the next pixel value is sufficiently close to the mean of the pixels already within the window. In this manner, large windows (long run lengths of pixels) are permitted for a string of pixels having comparable values, but otherwise new windows are started whenever a next pixel reveals a significant enough deviation from the established mean of prior pixels. Accordingly, this less complex mathematical approach nevertheless tends to easily get rid of large quantities of repetitive information but retains changes and deviations in the information. As such, the size of the data footprint is suitably reduced but the overall picture quality is retained.

Continuing with the example, the mean of the window is calculated (step 903). For the second iteration, the mean of the window is (90+91)/2=90.5. The next pixel 913 has a value of "89" which is still within the threshold of 90.5+/−5.0. Therefore, the window is extended for another pixel and corresponding iteration. The next iteration (step 902) adjusts the window size to $W_n=W_{n-1}+1=3$ (there are now three pixels in the window), and the threshold to a value of $Threshold_n=Threshold_{n-1}-(T/D)=5.0-(6.0/6.0)=5.0-1.0=4.0$. The mean of the window is calculated (step 903). For the third iteration, the mean of the window is (90+91+89)/3=90.

The next pixel 914 has a value of "89", which is still within the threshold of 90+/−4.0. Therefore, the window is extended for yet another pixel and corresponding iteration. Inset 910 also tracks the corresponding mean pixel value, window size, and threshold for each pixel. From inset 910, it is not until the seventh pixel 917 that the pixel value falls outside the prior established mean and threshold. As such, after the comparison of the seventh pixel value 917 against the prior established mean, the compression technique will close the window. The compression technique may also encode the pixel values 911-916 with greatly reduced information that specifies six consecutive pixels are to each have the mean value of 89.8 (=90.0 when rounded to be specified with eight bits).

Moreover, a next window is newly opened (step 901) starting with the seventh pixel 917. The process then repeats as described above until the linear vector of pixel values reveals a next pixel that falls outside the next window's mean.

Image compression system 150 may be used to filter entire sheetsides, horizontal stripes within sheetsides, entire images within sheetsides, horizontal stripes within images within sheetsides, or individual lines of continuous tone images within sheetsides. The net result is lower compression artifacts, less image distortion, and higher compression gain.

Figure 10:
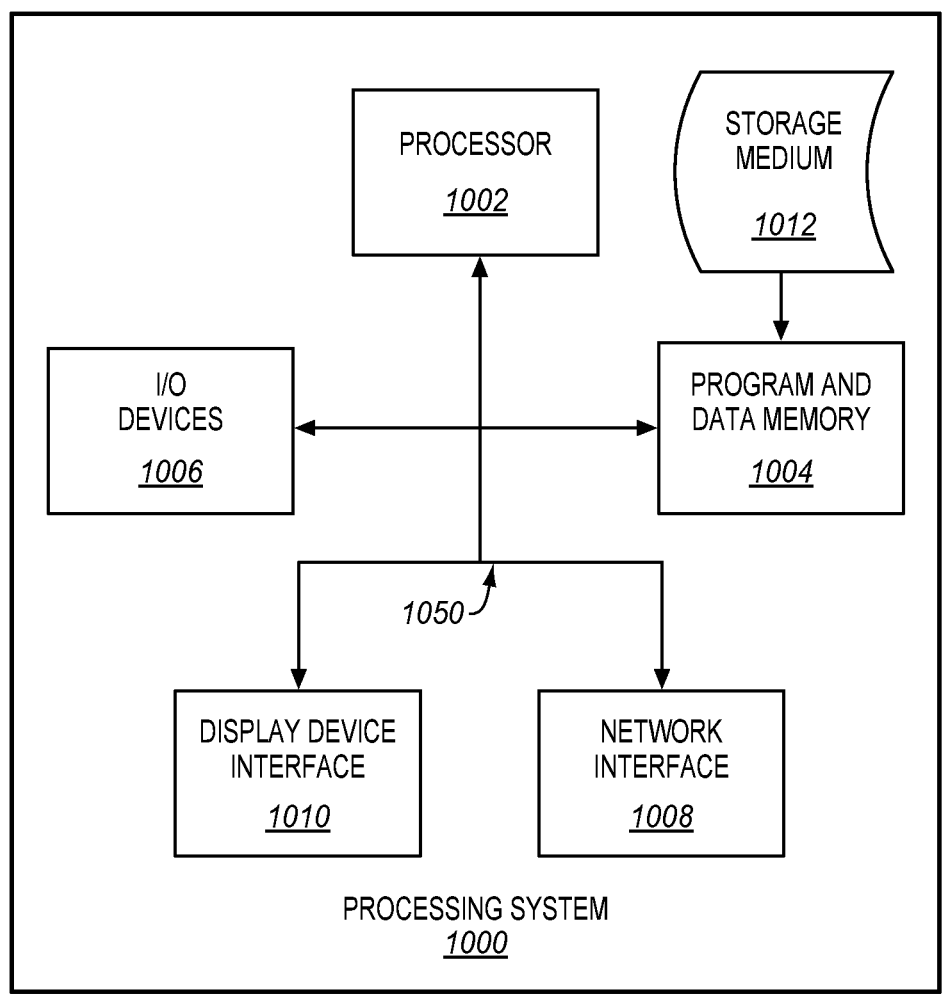
FIG. 10 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of the image forming apparatus 100 to perform the various operations disclosed herein. FIG. 10 illustrates a processing system 1000 operable to execute a computer readable medium embodying programmed instructions to perform desired functions in an illustrative embodiment. Processing system 1000 is operable to perform the above operations by executing programmed instructions tangibly embodied on computer readable storage medium 1012. In this regard, embodiments can take the form of a computer program accessible via computer-readable medium 1012 providing program code for use by a computer or any other instruction execution system. For the purposes of this description, computer readable storage medium 1012 can be anything that can contain or store the program for use by the computer.

Computer readable storage medium 1012 can be an electronic, magnetic, optical, electromagnetic, infrared, or semiconductor device. Examples of computer readable storage medium 1012 include a solid-state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1000, being suitable for storing and/or executing the program code, includes at least one processor 1002 coupled to program and data memory 1004 through a system bus 1050. Program and data memory 1004 can include local memory employed during actual execution of the program code, bulk storage, and cache memories that provide temporary storage of at least some program code and/or data in order to reduce the number of times the code and/or data are retrieved from bulk storage during execution.

I/O devices 1006 (including but not limited to keyboards, displays, pointing devices, etc.) can be coupled either directly or through intervening I/O controllers. Network adapter interfaces 1008 may also be integrated with the system to enable processing system 1000 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1010 may be integrated with the system to interface to one or more display devices, such as printing systems and screens for presentation of data generated by processor 1002.

Although specific embodiments are described herein, the scope of the disclosure is not limited to those specific embodiments. The scope of the disclosure is defined by the following claims and any equivalents thereof.

What is claimed is:

1. An image compression system, comprising:
   at least one processor; and
   a memory including computer program code executable by the processor to cause the image compression system to:
   receive a raster image comprising an array of pixels;
   divide the raster image into regions of the pixels;
   identify a region size limit for the regions; and
   for each region of the regions, the processor further causes the image compression system to:
   perform image filtering on the region with an image filter that operates based on a filter parameter, wherein the filter parameter is adjustable between a first value where minimal filtering is performed and a second value where maximum filtering is performed;
   for the image filtering, the processor further causes the image compression system to:
   measure a compressed region size of the region when compressed with a run-length encoding scheme;
   compute the filter parameter for the region based on the compressed region size and the region size limit; and
   apply the image filter on the region based on the filter parameter computed for the region to generate a filtered region having increased redundant patterns of pixel values.

2. The image compression system of claim 1 wherein the processor further causes the image compression system to:
   encode the filtered region with the run-length encoding scheme to generate a compressed region.

3. The image compression system of claim 2 wherein the processor further causes the image compression system to:
   initiate transmission of the compressed region over a communication link.

4. The image compression system of claim 3 wherein the processor further causes the image compression system to:
   compute the region size limit based on a bandwidth limit of the communication link.

5. The image compression system of claim 4 wherein the processor further causes the image compression system to:
   compute the region size limit based further on a length of the region, a width of the region, a width of a sheetside, a vertical resolution, and a speed of a recording medium.

6. The image compression system of claim 1 wherein:
   the filter parameter is a function of a size ratio, where the size ratio is a ratio of the compressed region size to the region size limit;
   a graph of the function has the first value for size ratios below a first ratio, has the second value for size ratios above a second ratio, and increases monotonically from the first value to the second value for size ratios between the first ratio and the second ratio;
   for the first ratio, the compressed region size is less than the region size limit; and
   for the second ratio, the compressed region size is greater than the region size limit.

7. The image compression system of claim 6 wherein:
   the function increases linearly from the first value to the second value for size ratios between the first ratio and the second ratio.

8. The image compression system of claim 6 wherein:
   for the first ratio, the compressed region size is in a range of 70-80% of the region size limit; and
   for the second ratio, the compressed region size is in a range of 120-130% of the region size limit.

9. An image forming apparatus comprising:
   the image compression system of claim 1.

10. A method of image compression, the method comprising:
   receiving a raster image comprising an array of pixels;
   dividing the raster image into regions of the pixels;
   identifying a region size limit for the regions; and
   for each region of the regions, performing image filtering on the region with an image filter that operates based on a filter parameter, wherein the filter parameter is adjustable between a first value where minimal filtering is performed and a second value where maximum filtering is performed;
   wherein the image filtering for each region comprises:
      measuring a compressed region size of the region when compressed with a run-length encoding scheme;
      computing the filter parameter for the region based on the compressed region size and the region size limit; and
      applying the image filter on the region based on the filter parameter computed for the region to generate a filtered region having increased redundant patterns of pixel values.

11. The method of claim 10 further comprising:
   encoding the filtered region with the run-length encoding scheme to generate a compressed region.

12. The method of claim 11 further comprising:
   initiating transmission of the compressed region over a communication link.

13. The method of claim 12 wherein identifying the region size limit for the regions comprises:
   computing the region size limit based on a bandwidth limit of the communication link.

14. The method of claim 13 wherein computing the region size limit comprises:
   computing the region size limit based further on a length of the region, a width of the region, a width of a sheetside, a vertical resolution, and a speed of a recording medium.

15. The method of claim 10 wherein:
   the filter parameter is a function of a size ratio, where the size ratio is a ratio of the compressed region size to the region size limit;
   a graph of the function has the first value for size ratios below a first ratio, has the second value for size ratios above a second ratio, and increases monotonically from the first value to the second value for size ratios between the first ratio and the second ratio;
   for the first ratio, the compressed region size is less than the region size limit; and
   for the second ratio, the compressed region size is greater than the region size limit.

16. A non-transitory computer readable medium embodying programmed instructions which, when executed by a processor, are operable for performing a method of image compression, the method comprising:
   receiving a raster image comprising an array of pixels;
   dividing the raster image into regions of the pixels;
   identifying a region size limit for the regions; and
   for each region of the regions, performing image filtering on the region with an image filter that operates based on a filter parameter, wherein the filter parameter is adjustable between a first value where minimal filtering is performed and a second value where maximum filtering is performed;
   wherein the image filtering for each region comprises:
      measuring a compressed region size of the region when compressed with a run-length encoding scheme;
      computing the filter parameter for the region based on the compressed region size and the region size limit; and
      applying the image filter on the region based on the filter parameter computed for the region to generate a filtered region having increased redundant patterns of pixel values.

17. The computer readable medium of claim 16 wherein the method further comprises:
   encoding the filtered region with the run-length encoding scheme to generate a compressed region.

18. The computer readable medium of claim 17 wherein the method further comprises:
   initiating transmission of the compressed region over a communication link.

19. The computer readable medium of claim 16 wherein identifying the region size limit for the regions comprises:
   computing the region size limit based on a bandwidth limit of the communication link.

20. The computer readable medium of claim 19 wherein computing the region size limit comprises:
   computing the region size limit based further on a length of the region, a width of the region, a width of a sheetside, a vertical resolution, and a speed of a recording medium.

* * * * *